United States Patent [19]
Tezuka et al.

[11] Patent Number: 5,685,902
[45] Date of Patent: Nov. 11, 1997

[54] CARBON FIBER-REINFORCED CONCRETE AND METHOD FOR PREPARING THE SAME

[75] Inventors: Mitsuharu Tezuka; Mitsuru Awata; Akira Shiraki, all of Aoba-ku, Japan

[73] Assignee: Mitsubishi Chemical Corporation, Tokyo, Japan

[21] Appl. No.: 574,432

[22] Filed: Dec. 15, 1995

[30] Foreign Application Priority Data

Dec. 19, 1994 [JP] Japan .................... 6-315023

[51] Int. Cl.$^6$ ...................... C04B 14/38; C04B 14/48
[52] U.S. Cl. .................... 106/643; 106/711; 106/717; 428/367; 428/372; 428/408; 428/902
[58] Field of Search ........................ 106/643, 711, 106/717, 737, 738; 428/367, 372, 688, 902, 408

[56] References Cited

U.S. PATENT DOCUMENTS

| | | | |
|---|---|---|---|
| 4,111,710 | 9/1978 | Pairaudeau et al. | 106/717 |
| 4,314,003 | 2/1982 | Curnow et al. | 428/902 |
| 4,565,840 | 1/1986 | Kobayashi et al. | 428/400 |
| 4,902,537 | 2/1990 | Yamada et al. | 428/408 |
| 4,910,076 | 3/1990 | Ando et al. | 428/245 |
| 4,915,739 | 4/1990 | Sawanobori et al. | 106/711 |
| 4,916,012 | 4/1990 | Sawanobori et al. | 428/367 |
| 5,030,282 | 7/1991 | Matsuhashi et al. | 106/717 |
| 5,032,181 | 7/1991 | Chung | 106/717 |
| 5,062,897 | 11/1991 | Katsumata et al. | 106/711 |
| 5,308,696 | 5/1994 | Hanashita et al. | 428/902 |

FOREIGN PATENT DOCUMENTS

| | | |
|---|---|---|
| 0 251 544 | 1/1988 | European Pat. Off. |
| 0 599 340 | 6/1994 | European Pat. Off. |

OTHER PUBLICATIONS

Chemical Abstracts, vol. 97, No. 4, Jul. 26, 1982, for JP 8 234 067.

*Primary Examiner*—Michael Marcheschi
*Attorney, Agent, or Firm*—Oblon, Spivak, McClelland, Maier & Neustadt, P.C.

[57] ABSTRACT

A carbon fiber-reinforced concrete containing a cement, a coarse aggregate, a fine aggregate, a carbon fiber and water, the carbon fiber having an average length not less than the maximum size of the coarse aggregate and also a tensile strength of at least 300 kgf/mm$^2$.

7 Claims, 1 Drawing Sheet

CARBON FIBER-REINFORCED CONCRETE AND METHOD FOR PREPARING THE SAME

The present invention relates to a carbon fiber-reinforced concrete having excellent strength and durability used mainly in civil engineering and architectural fields.

Heretofore, many fibers such as a steel fiber, a glass fiber and an organic fiber have been generally used as a fiber for a fiber-reinforced concrete in order to raise its strength and toughness. However, when a steel fiber is used, a rise in bending strength of the steel fiber-reinforced concrete is only about 50% in comparison with an unreinforced concrete, and there is a program that a load at the time of occurrence of initial cracking is substantially the same as that of an ordinary concrete. Further, there is a problem of durability due to occurrence of rust, and when the steel fiber-reinforced concrete is used for road pavement, there is caused a problem that an automobile tire is punctured by a protruded steel fiber at a wheel track.

When a glass fiber or an organic fiber is used, its reinforcing effect is extremely low since alkali resistance, tensile strength, elasticity and other properties of the fiber are not satisfactory, and a rise in strength can not be expected simply by preventing development of cracking.

On the other hand, when a carbon fiber is used, degradation of the fiber can be prevented and durability can be improved. However, it was only rod-like or mesh-like long fibers that have been heretofore used for a carbon fiber-reinforced concrete, and short fibers were used only for mortar containing no coarse aggregate or spraying repair material. The reason why the use of the short fibers was limited, was that the carbon fibers were badly cut and damaged when the carbon fibers were incorporated in the form of short fiber into a concrete containing a coarse aggregate and consequently that the aimed reinforcing effect could not be satisfactorily achieved on the final product. Even if the short carbon fibers were used, the effect was only to prevent development of cracking already occurred. In order to improve strength, it was tried to cure carbon fibers with an epoxy resin, thereby forming rod-like short fibers, but the rod-like short fibers were slipped out from a matrix when a bending load was applied and the aimed reinforcing effect could not be achieved.

In the case of a steel fiber-reinforced concrete (SFRC), a rise in compression strength is very small even if an amount of steel fibers incorporated is increased, and when the amount of steel fibers is more largely increased, a strength is rather lowered since the concrete is not satisfactorily compacted.

With regard to a compression toughness, when 1% of a compression stress is applied (for example when a big stress is forcedly applied by a big earthquake exceeding 400 gal), an ordinary concrete causes a stress exceeding 0.2% at the maximum compression stress point and accordingly causes brittleness destruction. With regard to relation between compression stress-strain, it is reported that toughness is liable to become larger proportionally as the amount of fibers becomes larger, but the toughness is not remarkably improved until a volume fraction (Vf) of the fibers is increased to 2%. In such a case, there are problems in respect of economic and operative performances. Also, when a water/cement (W/C) ratio is lowered, the maximum compression stress is improved but toughness is lowered. On the other hand, when the W/C ratio is raised, the toughness is improved, but the maximum compression stress is lowered. Further, there is an orientation problem, and depending on the orientation direction of fibers to compressing load direction, a brittle compression action is caused and a toughness is remarkably lowered.

In order to solve the above mentioned problems, the present inventors have variously studied and consequently found that a chopped strand comprising carbon fibers having a specific strength, a specific ductility and a specific elasticity, is useful for providing a carbon fiber-reinforced concrete of high strength, which does not cause initial cracking until a remarkably high load is applied. The present invention is based on this finding.

That is, the essential feature of the present invention resides in a carbon fiber-reinforced concrete comprising a cement, a coarse aggregate, a fine aggregate, a short carbon fiber and water, characterized in that the short carbon fiber has an average length of not less than the maximum size of the coarse aggregate and a tensile strength of not less than 300 kgf/mm$^2$.

The carbon fiber-reinforced concrete of the present invention can be produced by dispersing and curing a mixture comprising a cement, a coarse aggregate, a fine aggregate, water and a chopped strand of carbon fibers having an average length of not less than the maximum size of the coarse aggregate and a tensile strength of not less than 300 kgf/mm$^2$.

Figure 1:
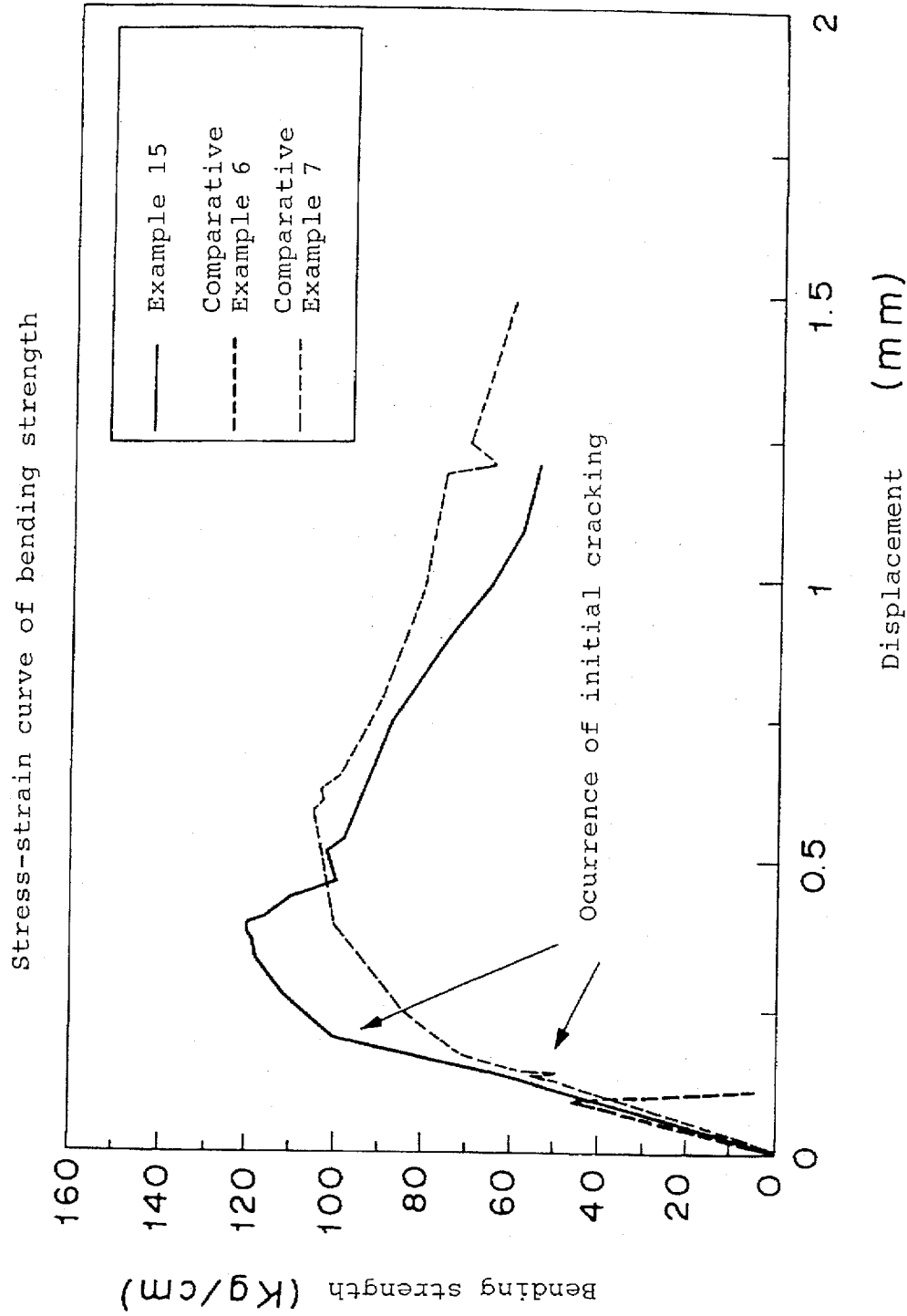
FIG. 1 shows the stress strain curves of bending strength for an example and 2 comparative examples.

Hereinafter, the present invention is further explained in more details.

The carbon fiber-reinforced concrete of the present invention contains a cement, a coarse aggregate, a fine aggregate, carbon fibers and water as main components.

The cement used in the present invention is not specially limited, examples of which include normal Portland cement, high-early-strength Portland cement, Portland blast furnace slag cement, aluminum cement and low shrinking cement, and among them, the low shrinking cement or the high-early-strength Portland cement is preferable. Generally, the amount of the cement used is preferably from 200 to 550 kg/m$^3$ in concrete.

The coarse aggregate (ballast) used in the present invention is an aggregate, 85 wt % of which remains on a 5 mm mesh sieve of sieve standard for concrete defined in Japan Architectural Society Reinforced Concrete Specification (JASS 5). The coarse aggregate actually used is not specially limited in respect of kind and diameter, and for example, broken stone, artificial light coarse aggregate, iron oxide ore or the like can be used. Among them, broken stone having a diameter not more than 50 mm is preferable. The coarse aggregate is used substantially in the same amount as used in civil engineering and architectural uses, and is preferably used in an amount of from 400 to 1,500 kg/m$^3$ in concrete.

Examples of the fine aggregate (sand) used in the present invention include sand, silica rock, ballast, shirasu balloon fly ash, silica fume, artificial light weight fine aggregate and the like. The fine aggregate is used substantially in the same amount as used in civil engineering and architectural uses, and is preferably used in an amount of from 400 to 1,500 kg/m$^3$. Also, the fine aggregate can be used in such a fine aggregate proportion (sand ratio, i.e. the proportion of the fine aggregate to the total aggregate) as usually used in civil engineering and architectural fields, and the fine aggregate proportion is preferably from 30 to 80 wt %.

The short carbon fiber used in the present invention is not specially limited, provided that it has a tensile strength of at least 300 kgf/mm$^2$, preferably at least 350 kgf/mm$^2$, and such carbon fibers as prepared from a starting material including polyacrylonitrile, coal tar pitch, petroleum pitch, coal-liquefied material or the like, can be used.

It is essential for the present invention that the carbon fibers should have an average length of not less than the substantial maximum size of coarse aggregate. In order to efficiently bind coarse aggregates to achieve an effect for strengthening a concrete structure, carbon fibers should preferably have an average length of at least 30 mm, more preferably at least 35 mm, and at least two times as long as the maximum size of coarse aggregate, but should not have an average length of more than 100 mm in view of dispersibility of the carbon fibers in concrete. Also, the carbon fibers used in the present invention have a ductility (expressed by the value obtained by dividing tensile strength by its tensile elasticity modulus) of at least 1%, preferably at least 1.7%. Also, if the tensile elasticity modulus exceeds 25 tonf/mm$^2$, the carbon fibers are hardly handled and are liable to be cut or broken when kneaded with concrete. The diameter of the carbon fiber used in the present invention is not specially limited, but is generally from 5 to 30 μm, preferably from 6 to 18 μm.

Short carbon fibers should preferably be used in the form of a chopped strand in view of dispersibility of carbon fibers in concrete. Also, if carbon fibers are kneaded with a cement, a coarse aggregate and the like and are dispersed therein in the form of single fibers, they are liable to be cut by the coarse aggregate. Therefore, it is preferable to knead the carbon fibers in the form of a chopped strand with a cement, a coarse aggregate and the like while maintaining the strand form, and it is also preferable to get a cement gel invaded into the strand and to maintain the strand form in the cured concrete wherein concrete is present between fibers. In a such a case, the number of fibers (filament number) in one fiber strand is not specially limited, but is preferably from 30 to 15,000, more preferably from 3,000 to 12,000 per strand. Also, a distance between single carbon fibers forming a strand should preferably be at least 10 μm, particularly from 20 to 100 μm. The distance between single fibers is measured by the following method (1) or (2) in the section vertical to the longitudinal direction of fibers in concrete.

(1) A method for determining a distance between single fibers in accordance with the following calculation formula.

(area per strand/fiber number in strand)$^{0.5}$–fiber diameter

In the above calculation formula, the area per strand is determined from an average value measured by a microscope, and an area appropriated by a single fiber is determined by dividing the area per strand by fiber number in the strand. Thus, the distance between single fibers can be determined by subtracting a fiber diameter value from a square root value of the appropriated area of a single fiber. The values of the distance between fibers in the following Examples and Comparative Examples were determined by this method.

(2) A method for determining an average distance between single fibers directly from a SEM photograph.

An amount of carbon fibers added is appropriately selected, and is preferably from 0.1 to 20 vol %, more preferably from 0.5 to 10 vol %.

In order to obtain the above mentioned strand, it is preferable to use a binder for carbon fibers. The binder has such an effect of appropriately dispersing chopped strand-like carbon fibers in concrete without cutting the carbon fibers when kneaded in the concrete containing a coarse aggregate. Examples of the binder include an epoxy emulsion containing no curing agent, and polyvinyl alcohol type binders including non-saponified polyvinyl acetate, partly saponified polyvinyl alcohol and completely saponified polyvinyl alcohol. Also, cellulose derivatives including methyl cellulose, ethyl cellulose, calboxyl ethyl cellulose, hydroxy ethyl cellulose and the like, and starch derivatives including soluble starch, can also be used.

A preferable binder is an epoxy emulsion containing no curing agent. The epoxy emulsion used in the present invention is an epoxy compound emulsified with a surface active agent. Examples of the epoxy compound include bisphenol type, novolak type, cycloaliphatic type, resol type or amino type epoxy compound monomers or low polymalzation products. Among them, a bisphenol A type epoxy compound having a molecular weight of not higher than 470 or a novolak type epoxy compound having a molecular weight of not higher than 600 is preferable, examples of which include commercially available products such as "EPIKOTE" 815, 827, 828 and 834 (trade name) manufactured by Shell Chemical Company and "ARALDITE" ECN-1235 (trade name) manufactured by Ciba Geigy Company. A surface active agent used for emulsifying these epoxy compounds is at least one surface active agent selected from the group of castor oil ether of polyoxymethylene, polyoxyethylene alkyl ether or polyoxyethylene alkylaryl ether of nonyl phenyl ether, styrene-modified phenyl ether or the like, and polyvinyl alcohol.

The binder can be applied by a well-known method. Generally, the binder is placed in water to prepare a binder solution having a desired concentration, and carbon fibers in the form of long fiber bathed in the binder solution by way of a pulley. After bathing, the bathed long carbon fibers are dried at 100° to 120° C. and the dried long carbon fibers are cut appropriately into short carbon fibers.

The amount of the binder attached to the fibers is preferably as little as possible in view of kneading conditions and strength of concrete, and accordingly the binder is used in such an amount as not to badly affect on handling of the fibers and on environmental problem and not to degrade the fibers. For example, in the case of an epoxy emulsion, the amount of the binder attached to the fibers is preferably not more than 5 wt %, more preferably from 0.5 to 2 wt % on the basis of dry fiber weight.

If the amount of a binder attached is too large, a binder such as an epoxy emulsion is present in a large proportion in the vicinity of carbon fibers, which tends to weaken the bonding between the carbon fibers and the concrete matrix, thereby lowering strength of the carbon fiber-reinforced concrete. Also, since the excess amount of a binder absorbs water in the concrete matrix, fluidity and packing properties of the carbon fiber-reinforced concrete become poor. On the other hand, when the amount of the binder is appropriate, the carbon fiber strand begins to satisfactorily get lose during kneading, thus dispersing the carbon fibers in concrete, so that cement comes into between fibers, thereby largely increasing contact areas between the carbon fiber strand and the concrete matrix, which remarkably raises a reinforcing effect by the carbon fibers and provides a concrete having a high strength and satisfactory fluidity and packing properties.

The amount of water used in the carbon fiber-reinforced concrete of the present invention is an amount necessary for curing cement, for example, from 25 to 70 wt % based on cement, and preferably from 100 to 350 kg/m$^3$ in concrete. Also, when a water reducing agent of high performance is used, the water amount may be lower than 25 wt %, but generally at least 10 wt % even in such a case.

The carbon fiber-reinforced concrete of the present invention may optionally contain additives such as a water reducing agent, a dispersing agent, a defoaming agent, a foaming agent or the like.

Examples of a water reducing agent include an oxycarboxylic acid, a special surfactant containing a triazine ring type high condensate salt as the main component, a special sulfonic group and carboxyl group-containing polyphyletic polymer, an anion type special high molecular surfactant, a naphthalene sulfonic acid condensate lignin sulfonic acid derivative, and the like. The amount of the additive is preferably from 1 to 5 wt % to cement.

Also, in the present invention, in addition to carbon fibers, other reinforcing fibers may be added depending on aimed purpose. For this purpose, a preferable example includes a steel fiber. A carbon fiber is light and achieves a high reinforcing effect, but does not have a satisfactory toughness and is cut when a load exceeding the critical limit is applied. Thus, when the carbon fiber is used as a reinforcing fiber, the critical limit is high, but when exceeding the critical limit, the reinforcing effect is instantly lost. Therefore, the total structure is liable to be brittle when a load exceeding the critical limit is applied. It is therefore preferable to admix a steel fiber which is not cut and maintains a strength to some extent while causing plastic deformation even when an excess degree of load is applied. The steel fiber used for such purpose is not specially limited, but its amount (vol %) should not exceed the amount of a carbon fiber.

The carbon fiber-reinforced concrete of the present invention can be prepared in a usual manner. Any type of mixer can be used for dispersing and kneading cement, coarse aggregate, fine aggregate, carbon fiber chopped strand, water and other additives. In the case of using a mixer having a mixing blade such as puddle type, propeller type, oar type, turbin type, pan type, ribbon type, screw type, warner type or kneader type mixers, carbon fibers and cement are firstly mixed without adding water, and the resultant mixture is then kneaded with water. In an alternative method, raw materials other than carbon fibers are kneaded with water to prepare an ordinary concrete, and thereafter, carbon fibers are admixed and kneaded therewith.

EXAMPLES

The present invention is further illustrated by the following Examples but should not be limited thereto.

The following Table 1 shows conditions (except for lengths) of carbon fiber-chopped strands used in Examples and Comparative Examples.

In Table 1, A-1 to A-4 are PAN type carbon fibers "PYROFIL" (trade mark) "TR-40" manufactured by Mitsubishi Rayon Company LTD; B, C and E are respectively PAN type carbon fibers "TORAYCA" (trade mark) "T-300", "T-700" and "M-40" manufactured by Toray company LTD; and D is pitch type carbon fibers "DIALEAD" (trade mark) "K661" manufactured by Mitubishi Chemical Company LTD. An epoxy emulsion solution containing no curing agent, which comprises 60 parts by weight of an epoxy compound "EPIKOTE 834" (manufactured by Shell Chemical Company) and 40 parts by weight of "EPIKOTE 1004" (manufactured by Shell Chemical Company", was used in an amount of 1.0 wt % as a binder for preparing each of carbon fiber strands.

TABLE 1

| | Conditions of carbon fibers | | | |
|---|---|---|---|---|
| Type | Tensile Strength (kgf/mm$^2$) | Ductility (%) | Fiber number per strand | Tensile elasticity modulus (tonf/mm$^2$) |
| A-1 | 450 | 2.0 | 12000 | 22.5 |
| A-2 | 450 | 2.0 | 6000 | 22.5 |
| A-3 | 450 | 2.0 | 3000 | 22.5 |
| A-4 | 450 | 2.0 | 1000 | 22.5 |
| B | 380 | 1.7 | 12000 | 22.4 |
| C | 640 | 2.6 | 12000 | 24.6 |
| D | 200 | 1.0 | 6000 | 20.0 |
| E | 280 | 0.7 | 3000 | 40.0 |

Examples 1 to 12 and Comparative Examples 1 to 4

(architectural use)

In a mixer (inner volume: 70 litters) equipped with a stirrer, were placed a high-early-strength Portland cement as a cement, broken stone No.6 (maximum diameter: 15 mm) as a coarse aggregate and fine sand of Chichibu-occurring sand rock as a fine aggregate in such weight ratios as shown in the following Table 2. Further, each of carbon fiber chopped strand respectively having such conditions including type, average length of fiber and total volume fraction (Vf) as shown in Table 2 was added thereto and the resultant mixture was dry-mixed for 30 seconds (Comparative Example 1 was mixed without adding carbon fiber). Thereafter, to the resultant dry mixture, were added 1 part by weight of a water reducing agent ("PARIC SA" comprising oxycarboxylic acid, trade name, manufactured by Fujisawa Yakuhin Company LTD) and 56 parts by weight of water in a water/cement ratio (W/C) of 56/100, and the resultant mixture was kneaded for 90 seconds to obtain a mixture having short carbon fiber strands fully dispersed. The mixture was then aged (cured) for 4 weeks under conditions of 20° C. and 60 RT % to obtain a carbon fiber-reinforced concrete. The concrete thus obtained was subjected to a bending test (test number n=6) at a loading speed of 2 mm/min in accordance with JIS A 1106. The bending strength values thus measured, together with slump values of cement mixtures before curing and air amounts in concretes after curing are summarized in Table 2. A distance between carbon fibers in strand unit in each concrete ranged from 30 to 40 μm.

TABLE 2

| | | Composition | | | | | | | | | | | | |
|---|---|---|---|---|---|---|---|---|---|---|---|---|---|---|
| | | Fine aggregate proportion (wt %) | Unit water amount (kg/m³) | Air amount (%) | Water reducing agent (kg/m²) | Absolute volume (l/m³) | | | Weight (kg/m³) | | | Carbon Fiber | | Bending strength (kg/cm²) |
| | Slump (cm) | | | | | Cement | Fine aggregate | Coarse aggregate | Cement | Fine aggregate | Coarse aggregate | Fiber used | Vf (vol %) | Fiber length (mm) | |
| Example 1 | 2.5 | 50 | 176 | 4 | 1 | 111 | 264 | 263 | 350 | 700 | 700 | A-1 | 1.5 | 40 | 121 |
| Example 2 | 1.5 | 50 | 176 | 4 | 1 | 110 | 262 | 261 | 349 | 695 | 695 | A-1 | 1.0 | 40 | 152 |
| Example 3 | 1.0 | 50 | 176 | 4 | 1 | 109 | 260 | 259 | 348 | 690 | 690 | A-1 | 1.5 | 40 | 181 |
| Example 4 | 0.5 | 50 | 176 | 4 | 1 | 108 | 258 | 257 | 347 | 685 | 685 | A-1 | 2.0 | 40 | 223 |
| Example 5 | 1.5 | 50 | 176 | 4 | 1 | 110 | 264 | 261 | 349 | 695 | 695 | A-2 | 1.0 | 40 | 145 |
| Example 6 | 1.0 | 50 | 176 | 4 | 1 | 110 | 264 | 261 | 349 | 695 | 695 | A-3 | 1.0 | 40 | 148 |
| Example 7 | 0.5 | 50 | 176 | 4 | 1 | 110 | 264 | 261 | 349 | 695 | 695 | A-4 | 1.0 | 40 | 167 |
| Example 8 | 1.5 | 50 | 176 | 4 | 1 | 110 | 262 | 261 | 349 | 695 | 695 | A-1 | 1.0 | 30 | 130 |
| Example 9 | 2.0 | 50 | 176 | 4 | 1 | 110 | 262 | 261 | 349 | 695 | 695 | A-1 | 1.0 | 50 | 145 |
| Example 10 | 1.5 | 41 | 176 | 4 | 1 | 110 | 264 | 261 | 320 | 740 | 1070 | A-1 | 1.0 | 40 | 122 |
| Example 11 | 1.5 | 50 | 176 | 4 | 1 | 110 | 264 | 261 | 349 | 695 | 695 | B | 1.0 | 40 | 140 |
| Example 12 | 1.5 | 50 | 176 | 4 | 1 | 110 | 264 | 261 | 349 | 695 | 695 | C | 1.0 | 40 | 172 |
| Comparative Example 1 | 4.0 | 50 | 176 | 4 | 1 | 112 | 266 | 265 | 351 | 705 | 705 | — | — | — | 44 |
| Comparative Example 2 | 3.5 | 50 | 176 | 4 | 1 | 110 | 264 | 261 | 349 | 695 | 695 | A-1 | 1.0 | 10 | 50 |
| Comparative Example 3 | 3.5 | 50 | 176 | 4 | 1 | 112 | 266 | 265 | 349 | 695 | 695 | D | 1.0 | 40 | 48 |
| Comparative Example 4 | 1.5 | 50 | 176 | 4 | 1 | 112 | 266 | 265 | 349 | 695 | 695 | E | 1.0 | 40 | 55 |

Examples 13 to 14 and Comparative Example 5 (civil engineering use)

In a mixer (inner volume: 70 litters) equipped with a stirrer, were placed a hight-early-strength Portland cement as a cement, broken stone No. 4 (maximum diameter: 30 mm) or broken stone No.3 (maximum diameter: 40 mm) as a coarse aggregate and fine sand of Chichibu-occurring sand rock as a fine aggregate as such weight ratios as shown in Table 3. Further, 40 mm chopped strand cut from Type A-1 carbon fiber (12,000 fibers/strand) shown in Table 1 was added thereto in a total volume fraction (Vf) of 1.0% (Comparative Example 5 did not contain carbon fiber), and the resultant mixture was dry-mixed for 30 seconds. Thereafter, 57 parts by weight of water containing 1 part by weight of a water reducing agent "PARICK SA" was added to the dry mixture, and the resultant mixture was kneaded for 90 seconds to obtain a mixture having short fiber strands fully dispersed. The kneaded mixture thus obtained was aged (cured) for 4 weeks under conditions of 20° C. and 60 RT % to obtain a carbon fiber-reinforced concrete.

The concrete thus obtained was subjected to a bending test (test number n=6) at a loading speed of 2 mm/min in accordance with JIS A 1106. The results are shown in the following Table 3. A distance between carbon fibers in strand unit in each concrete ranged from 30 to 40 μm.

TABLE 3

|  | Slump (cm) | Maximum size of coarse aggregate (mm) | Air amount (%) | Water amount in cement ratio (%) | Fine aggregate proportion (%) | Weight (kg/m³) | | | | | Carbon Fiber | | | Bending strength (kg/cm²) |
|---|---|---|---|---|---|---|---|---|---|---|---|---|---|---|
|  |  |  |  |  |  | Water | Cement | Fine aggregate | Coparse aggregate | Water reducing agent | Fiber used | Vf (vol %) | Fiber length (mm) |  |
| Example 13 | 2 | 30 | 4 | 41 | 40 | 170 | 410 | 680 | 1020 | 2 | A-1 | 1.0 | 40 | 125 |
| Example 14 | 1 | 40 | 3 | 46 | 36 | 160 | 350 | 612 | 1088 | 2 | A-1 | 1.0 | 40 | 120 |
| Comparative Example 5 | 5 | 30 | 5 | 41 | 40 | 169 | 413 | 685 | 1027 | 2 | — | — | — | 40 |

Example 15

As indicated in the following Table 4, 585 kg/m³ of a hight-early-strength Portland cement (water amount in cement=35%), 898 kg/m³ of a fine aggregate (fine sand of Chichibu-occurring sand rock, fine aggregate proportion=70%), 400 kg/m³ of a coarse aggregate (broken stone No.6, maximum diameter=15 mm), 65 kg/m³ of silica fume ("940 U" of Erukemu Company), 2.2 wt % parts of a mixing agent ("CHUPOL HP 11" of Takemotoyushi) and 0.75 % Vf of a carbon fiber (Type A-1) were mixed in the following manner by using a two-axial type mixer (55 litters). That is, firstly the coarse aggregate was dry-mixed with the fine aggregate for 30 seconds, and the cement and the cilica fume were then added thereto and dry-mixed. Thereafter, a mixture solution of water and the mixing agent was added thereto, and the resultant mixture was wet-mixed for 150 seconds. Finally, 40 mm chopped strand of carbon fiber (Type A-1) was added thereto, and the resultant mixture was wet-mixed for 60 seconds.

The kneaded mixture thus obtained was cast into a mold and was steam-aged at 65° C. for 3 hours. After 16 hours, the cured product was demolded. The cured product thus obtained was aged under conditions of 20° C. and 60 RT %, and after one week-aging, the product thus obtained was subjected to a compression test in accordance with JIS A 1108. The results are shown in FIG. 1. Also, a bending test (test number n=6) was conducted at a loading speed of 2 mm/min in accordance with JIS A 1106. The results are shown in the following Table 4.

Comparative Example 6

The cement composition containing no carbon fibers as shown in the following Table 4 was aged (cured) in the same manner as in Example 15. The cured concrete composition thus obtained was subjected to a compression test and a bending test in the same manner as in Example 15, and the results are shown in FIG. 1 and Table 4.

Comparative Example 7

The same procedure as in Example 15 was repeated, except that the cement composition contained a steel fiber (Shinkou Fiber "TOMAACE") having an average fiber length of 50 mm in place of the carbon fiber. The results are shown in FIG. 1 and Table 4.

FIG. 1 illustrates stress-strain curves of bending strengths in respect of a carbon fiber-reinforced concrete of the present invention (Example 15), a concrete containing no carbon fiber (Comparative Example 6) and a steel fiber-reinforced concrete (Comparative Example 7).

TABLE 4

|  | Water amount in cement (wt %) | Slump (cm) | Maximum size of coarse aggregate (mm) | Fine aggregate proportion (wt %) | Unit water amount (kg/m³) | Air amount (%) | Surface active agent (wt %) | Weight (kg/m³) | | | |
|---|---|---|---|---|---|---|---|---|---|---|---|
|  |  |  |  |  |  |  |  | Cement | Fine aggregate | Coarse aggregate | Silica fume |
| Example 15 | 39 | 7 | 15 | 70 | 228 | 4 | 2.2 | 585 | 898 | 400 | 65 |
| Comparative Example 6 | 35 | 20 | 15 | 70 | 228 | 4 | 2.2 | 650 | 927 | 412 | 0 |
| Comparative Example 7 | 39 | 7 | 15 | 70 | 228 | 4 | 2.2 | 585 | 898 | 400 | 65 |

|  | Composition strength (kg/cm²) n = 6 | Average compression strength | Bending strength (kg/cm²) n = 6 | Average bending strength |
|---|---|---|---|---|
| Example 15 | 500.485.497 488.515.480 | 494 | 120.115.108 (105) (100) (101) 117.125.131 (106) (110) (118) | 119 (109) |
| Compara- | 331.320.291 | 310 | 44. 47. 48 | 47 |

TABLE 4-continued

| | | | | |
|---|---|---|---|---|
| tive Example 6 | 300.309.311 | | (44) (47) (48) 45. 50. 48 (45) (50) (48) | (47) |
| Comparative Example 7 | — | — | 115.105.118 (55) (58) (50) 100.105.98 (57) (50) (55) | 107 (54) |

As mentioned above, in the carbon fiber-reinforced concrete of the present invention, the carbon fiber is not damaged. Thus, the carbon fiber-reinforced concrete of the present invention provides a very high mechanical strength and does not cause an initial cracking until an extremely high load is applied. Accordingly, the carbon fiber-reinforced concrete of the present invention is useful not only for a civil engineering field including a road repair but also for a construction field including use as an outside wall material.

What is claimed is:

1. A carbon fiber-reinforced concrete containing a cement, a coarse aggregate, a fine aggregate, a carbon fiber and water, wherein the carbon fiber is dispersed in the carbon fiber-reinforced concrete in an amount of from 0.1 to 20 vol % and has an average length in the range of from 30 mm to 100 ram, and not less than the maximum size of the coarse aggregate, a tensile strength of at least 300 kgf/mm$^2$ and a ductility of at least 1%.

2. The carbon fiber-reinforced concrete according to claim 1, wherein the carbon fibers are bound by a binder in an amount of not more than 5% by weight based on the weight of the fibers.

3. The carbon fiber-reinforced concrete according to claim 2, wherein the binder is an epoxy emulsion.

4. The carbon fiber-reinforced concrete according to claim 1, wherein the carbon fiber has a tensile elasticity modulus of not more than 25 tonf/mm$^2$.

5. The carbon fiber-reinforced concrete according to claim 1, wherein the carbon fiber has an average length of at least 2 times as large as the maximum size of the coarse aggregate.

6. The carbon fiber-reinforced concrete according to claim 1, further comprising a steel fiber in an amount of not more than the carbon fiber content.

7. A method for preparing a carbon fiber-reinforced concrete, which comprises dispersing a mixture of a cement, a coarse aggregate, a fine aggregate, water and a chopped strand of carbon fibers having an average length in the range of from 30 mm to 100 mm, and not less than the maximum size of the coarse aggregate, a tensile strength of at least 300 kgf/mm$^2$, and a ductility of at least 1%.

* * * * *